W. M. CHRISTIANSON.
NUT LOCK.
APPLICATION FILED JAN. 10, 1912.
1,029,103.
Patented June 11, 1912.
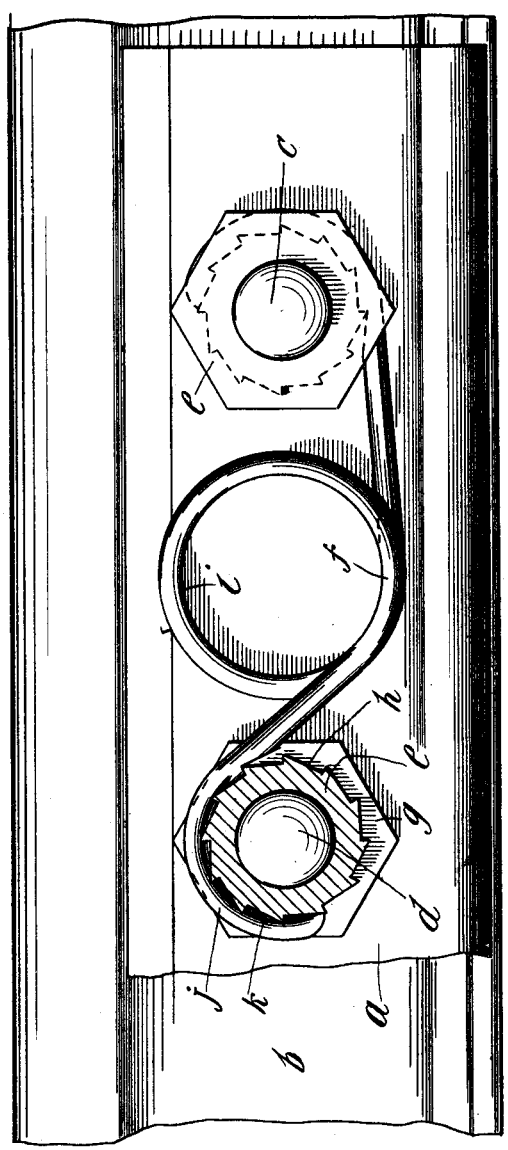
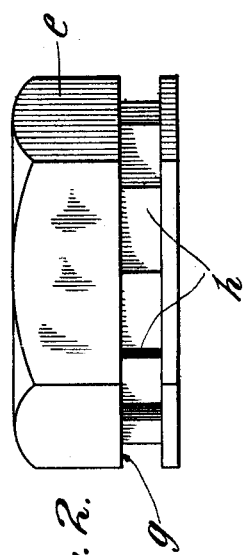
WITNESSES:
INVENTOR
William M. Christianson.
BY
ATTORNEY

UNITED STATES PATENT OFFICE.

WILLIAM M. CHRISTIANSON, OF PORTLAND, OREGON.

NUT-LOCK.

1,029,103.

Specification of Letters Patent.  Patented June 11, 1912.

Application filed January 10, 1912. Serial No. 670,501.

*To all whom it may concern:*

Be it known that I, WILLIAM M. CHRISTIANSON, a citizen of the United States, residing at Portland, in the county of Multnomah and State of Oregon, have invented certain new and useful Improvements in Nut-Locks, of which the following is a specification.

My invention relates to means for locking the nuts on bolts, and has particular reference to the nuts of the bolts that are used to join railway rails.

The object of my invention is to provide simple and efficient means for accomplishing this purpose, as is clearly set forth in the following description, and illustrated in the appended drawing, of which:

Figure 1 is a side elevation of a rail joint embodying my invention, and Fig. 2 illustrates on a larger scale the construction of the nuts used in my device.

The fish-plate $a$, rails $b$ and bolts $c$, $d$ are all of the usual construction, but the nuts $e$, which are used in connection with said bolts for clamping the fish-plate on the rails, are made with a groove $g$, the bottom of which is provided with an endless series of ratchet teeth $h$. A rod $f$, made of resilient metal, is coiled into a loop $i$, and the ends $j$ of the rod are hook-shaped, having been given substantially a half turn right and left, as clearly shown in the drawing. On the inner surfaces of these hooks I provide ratchet teeth $k$, corresponding in shape to the ratchet teeth $h$ of the nuts.

In operation the bolts are first placed, and the nuts screwed up tight, whereupon the lock-rod is mounted in position, it being resilient enough to pass over a nut and snap into place.

While I have found that I get the best results by coiling the lock-rod into the shape shown by letter $i$, it is obvious that any shape, which will give the rod sufficient resiliency and strength, may be substituted.

It is clearly seen, that any tendency on the part of the nuts to unscrew, is met by the spring tension of the rod, and yet the rod can be removed at any time without suffering any injury.

I am aware that similar locking means have been produced, but no lock-rod has been conceived of, which can be attached after the rails are all clamped together, and which can be removed and used over again.

I claim:

1. In a rail joint, the combination with a pair of clamping bolts; of a pair of lock nuts, said lock nuts made with an annular groove, said groove having an endless series of indentations; and a resilient lock rod, said rod shaped to hook on to said nuts and provided with a series of projections adapted to engage the indentations of said nuts and thereby to prevent the nuts working loose but permitting of tightening without removing the said lock rod.

2. In a rail joint, the combination of a pair of clamping bolts; with a pair of locknuts adapted to engage said bolts, said nuts made with an annular groove, and provided with ratchet teeth at the bottom of said groove; and a resilient lock-rod provided with a central loop and having its ends formed into right and left hooks adapted to engage said grooves, said hooks having on their inner surface a series of ratchet teeth registering with the teeth in said grooves, whereby said nuts are retained in a locked position.

In testimony whereof I have hereunto affixed my signature in the presence of two witnesses.

WILLIAM M. CHRISTIANSON.

Witnesses:
LESTER W. HUMPHREYS,
C. W. HILLS.

Copies of this patent may be obtained for five cents each, by addressing the "Commissioner of Patents, Washington, D. C."